United States Patent
Negi

(10) Patent No.: US 8,713,008 B2
(45) Date of Patent: Apr. 29, 2014

(54) APPARATUS AND METHOD FOR INFORMATION PROCESSING, PROGRAM, AND RECORDING MEDIUM

(75) Inventor: Daisuke Negi, Tokyo (JP)

(73) Assignee: Sony Corporation, Tokyo (JP)

( * ) Notice: Subject to any disclaimer, the term of this patent is extended or adjusted under 35 U.S.C. 154(b) by 563 days.

(21) Appl. No.: 12/240,198

(22) Filed: Sep. 29, 2008

(65) Prior Publication Data

US 2009/0089242 A1 Apr. 2, 2009

(30) Foreign Application Priority Data

Oct. 1, 2007 (JP) ................... P2007-257117

(51) Int. Cl.
*G06F 7/00* (2006.01)
*G06F 17/30* (2006.01)
*G06F 15/16* (2006.01)

(52) U.S. Cl.
USPC ............................ 707/730; 707/780; 707/914

(58) Field of Classification Search
USPC ........................................ 707/730, 780, 914
See application file for complete search history.

(56) References Cited

U.S. PATENT DOCUMENTS

| | | | | |
|---|---|---|---|---|
| 5,691,972 A | * | 11/1997 | Tsuga et al. | 369/275.3 |
| 6,137,544 A | * | 10/2000 | Dimitrova et al. | 348/700 |
| 6,389,168 B2 | * | 5/2002 | Altunbasak et al. | 348/700 |
| 7,254,311 B2 | * | 8/2007 | Nagasaka et al. | 707/4 |
| 7,751,483 B1 | * | 7/2010 | Ganea | 375/240.22 |
| 2001/0004739 A1 | * | 6/2001 | Sekiguchi et al. | 707/1 |
| 2002/0051207 A1 | * | 5/2002 | Ohkubo et al. | 358/1.18 |
| 2005/0183016 A1 | * | 8/2005 | Horiuchi et al. | 715/719 |
| 2006/0168284 A1 | * | 7/2006 | Holthe | 709/231 |
| 2007/0143269 A1 | * | 6/2007 | Ando et al. | 707/3 |
| 2008/0131072 A1 | * | 6/2008 | Chang et al. | 386/52 |
| 2008/0208791 A1 | * | 8/2008 | Das et al. | 707/1 |
| 2008/0282287 A1 | * | 11/2008 | Chen et al. | 725/37 |
| 2008/0313152 A1 | * | 12/2008 | Yoon et al. | 707/3 |

FOREIGN PATENT DOCUMENTS

| | | |
|---|---|---|
| JP | 2002-55695 | 2/2002 |
| JP | 2002-152669 | 5/2002 |

\* cited by examiner

*Primary Examiner* — Greta Robinson
*Assistant Examiner* — Brian E. Weinrich
(74) *Attorney, Agent, or Firm* — Frommer Lawrence & Haug LLP; William S. Frommer

(57) ABSTRACT

An information processing apparatus includes the following elements. A feature amount extraction unit extracts feature amounts from a content block. An extraction unit extracts predetermined scenes from the content block using the feature amounts extracted by the feature amount extraction unit. An acquisition unit acquires information for retrieving the content block. A retrieval unit retrieves a scene that meets the information acquired by the acquisition unit from among the scenes extracted by the extraction unit. A presentation unit presents the content block including the scene retrieved by the retrieval unit as a result of retrieval.

8 Claims, 6 Drawing Sheets

APPARATUS AND METHOD FOR INFORMATION PROCESSING, PROGRAM, AND RECORDING MEDIUM

CROSS REFERENCES TO RELATED APPLICATIONS

The present invention contains subject matter related to Japanese Patent Application JP 2007-257117 filed in the Japanese Patent Office on Oct. 1, 2007, the entire contents of which are incorporated herein by reference.

BACKGROUND OF THE INVENTION

1. Field of the Invention

The present invention relates to apparatuses and methods for information processing, programs, and recording media, and in particular, relates to an information processing apparatus and method for providing information in the form of meaningful unity to a user, a program, and a recoding medium.

2. Description of the Related Art

To retrieve a piece of video content (hereinafter, also referred to as "video content block"), a method of specifying a keyword to retrieve the video content block, a method of utilizing a reference image or a reference video sequence for retrieving the video content block including a portion that matches or is similar to the reference image, and a method of specifying information, such as a color or the intensity of motion, to retrieve the video content block have been used. In addition, a method of retrieving a video content block in units of video content blocks and a method of retrieving a video content block in units of scenes, obtained by segmenting the video content block, have been proposed. For example, Japanese Unexamined Patent Application Publication No. 2004-227423 discloses such a method.

SUMMARY OF THE INVENTION

With the improvement of video analysis technology and the widespread use of annotation services for video content, the application of meanings to scenes of a content block has increased. An annotation service is as follows: In response to a user's desire to not only view a lot of web pages and multimedia content on the Internet but also highly utilize such web pages and multimedia content, such content is associated with any information and the resultant content is provided to the user.

With the widespread use of the annotation services, the increase in accuracy of methods for retrieving a video sequence, desired by a user, in units of scenes is expected. However, in a case where a video sequence is retrieved in units of scenes and scenes are provided as a result of retrieval to the user, the user can obtain desired scenes but video segments obtained as the retrieved scenes may have no meaning. The meaningful result of retrieval may not necessarily be provided to the user.

The present invention has been made in consideration of the above-described circumstances. It is desirable to provide a result of retrieval meaningful for a user.

According to an embodiment of the present invention, an information processing apparatus includes feature amount extraction means for extracting feature amounts from a content block, extraction means for extracting predetermined scenes from the content block using the feature amounts extracted by the feature amount extraction means, acquisition means for acquiring information for retrieving the content block, retrieval means for retrieving a scene that meets the information acquired by the acquisition means from among the scenes extracted by the extraction means, and presentation means for presenting the content block including the scene retrieved by the retrieval means as a result of retrieval.

When presenting a plurality of content blocks, the presentation means may assign priorities to the content blocks in the order from the largest number of scenes retrieved by the retrieval means and present the content blocks in accordance with the priorities.

When presenting a plurality of content blocks, the presentation means may obtain the sum of the durations of scenes retrieved from each content block by the retrieval means, assign priorities to the content blocks in the order from the highest sum, and present the content blocks in accordance with the priorities.

When presenting a plurality of content blocks, the presentation means may obtain the proportion of the sum of the durations of scenes retrieved by the retrieval means in each content block, assign priorities to the content blocks in the order from the highest proportion, and present the content blocks in accordance with the priorities.

When presenting a plurality of content blocks, the presentation means may obtain the degree, at which each scene retrieved by the retrieval means meets the information, in each content block, assign priorities to the content blocks in the order from the highest degree, and present the content blocks in accordance with the priorities.

According to another embodiment of the present invention, there is provided a method for information processing, the method including the steps of extracting feature amounts from a content block, extracting predetermined scenes from the content block using the extracted feature amounts, acquiring information for retrieving the content block, retrieving a scene that meets the acquired information from among the extracted scenes, and presenting the content block including the retrieved scene as a result of retrieval.

According to another embodiment of the present invention, there is provided a program that allows a computer to perform a process including the steps of extracting feature amounts from a content block, extracting predetermined scenes from the content block using the extracted feature amounts, acquiring information for retrieving the content block, retrieving a scene that meets the acquired information from among the extracted scenes, and presenting the content block including the retrieved scene as a result of retrieval.

According to another embodiment of the present invention, there is provided a recording medium in which a computer-readable program is recorded, the program including the steps of extracting feature amounts from a content block, extracting predetermined scenes from the content block using the extracted feature amounts, acquiring information for retrieving the content block, retrieving a scene that meets the acquired information from among the extracted scenes, and presenting the content block including the retrieved scene as a result of retrieval.

In the apparatus and method for information processing and the program according to the above-described embodiments of the present invention, a predetermined scene is retrieved from a content block using feature amounts, related to scenes, extracted from the content block and information, concerning a target scene, supplied from a user and the content block including the retrieved scene is presented as a result of retrieval to the user.

According to any of the embodiments of the present invention, a content block retrieved in units of scenes can be provided as meaningful information to the user.

DESCRIPTION OF THE PREFERRED EMBODIMENTS

Figure 1:
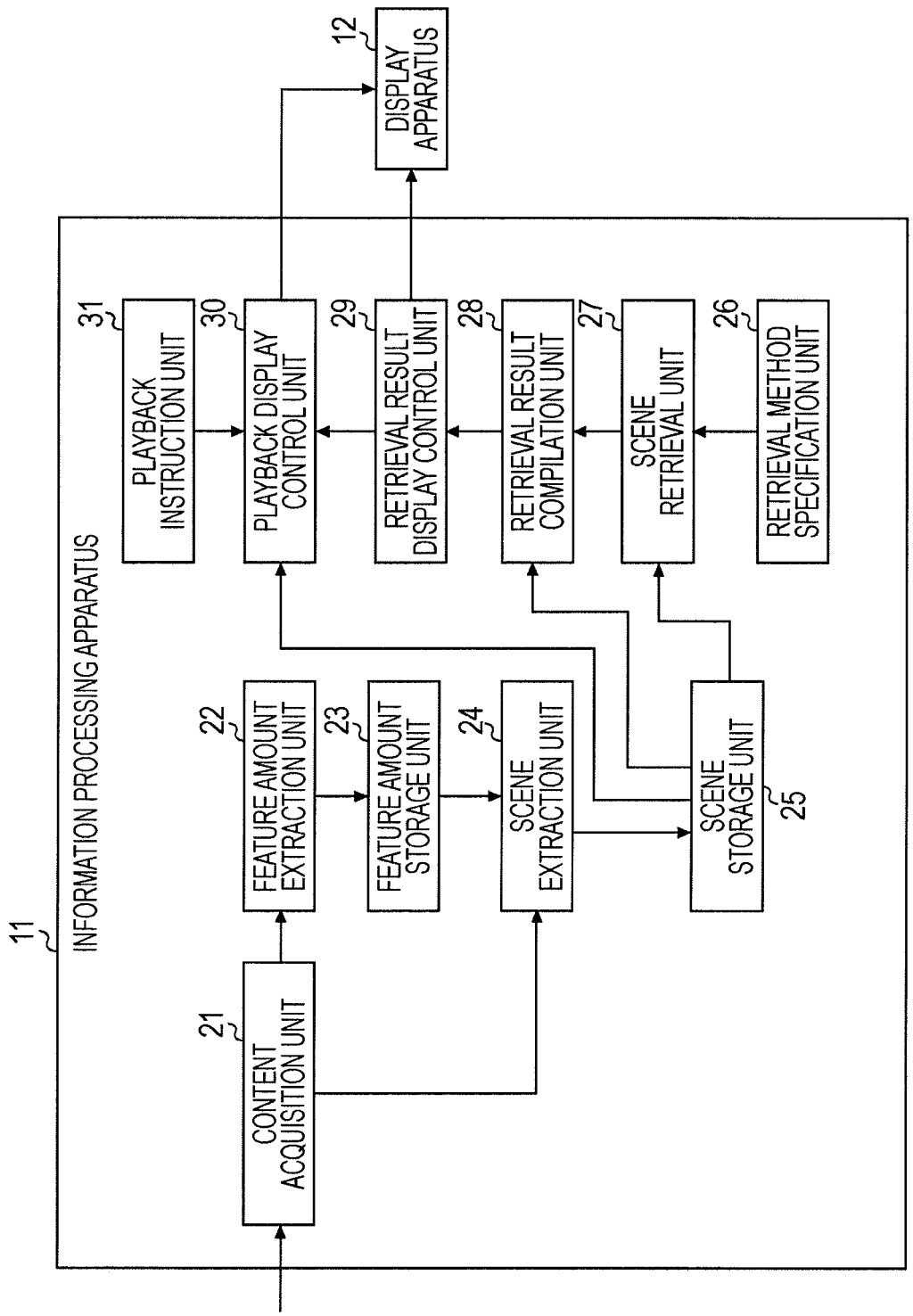
FIG. 1 is a diagram illustrating the structure of an information processing apparatus according to an embodiment of the present invention.

Before describing an embodiment of the present invention, the correspondence between the features of the present invention and the specific elements disclosed in an embodiment of the present invention in the specification and the drawings is discussed below. This description is intended to assure that embodiments supporting the claimed invention are described in this specification and the drawings. Thus, even if an element in the following embodiments or the drawings is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

According to an embodiment of the present invention, an information processing apparatus (e.g., an information processing apparatus 11 in FIG. 1) includes feature amount extraction means (e.g., a feature amount extraction unit 22 in FIG. 1) for extracting feature amounts from a content block, extraction means (e.g., a scene extraction unit 24 in FIG. 1) for extracting predetermined scenes from the content block using the feature amounts extracted by the feature amount extraction means, acquisition means (e.g., a retrieval method specification unit 26 in FIG. 1) for acquiring information for retrieving the content block, retrieval means (e.g., a scene retrieval unit 27 in FIG. 1) for retrieving a scene that meets the information acquired by the acquisition means from among the scenes extracted by the extraction means, and presentation means (e.g., a retrieval result compilation unit 28 in FIG. 1) for presenting the content block including the scene retrieved by the retrieval means as a result of retrieval.

An embodiment of the present invention will be described below with reference to the drawings.

FIG. 1 is a diagram illustrating the information processing apparatus according to the embodiment of the present invention. Referring to FIG. 1, the information processing apparatus 11 includes a content acquisition unit 21, the feature amount extraction unit 22, a feature amount storage unit 23, the scene extraction unit 24, a scene storage unit 25, the retrieval method specification unit 26, the scene retrieval unit 27, the retrieval result compilation unit 28, a retrieval result display control unit 29, a playback display control unit 30, and a playback instruction unit 31. The retrieval result display control unit 29 and the playback display control unit 30 are connected to a display apparatus 12 to control display of the display apparatus 12.

The content acquisition unit 21 acquires a piece of content, or a content block. In this embodiment, it is assumed that a content block to be acquired is a video sequence. The content acquisition unit 21 acquires a content block managed by another apparatus connected to the information processing apparatus 11 via a network including the Internet or a content block managed by a user's personal computer. Content blocks to be acquired may include a content block that is on public view via the Internet and a private content block, such as a video sequence captured by the user.

The feature amount extraction unit 22 extracts amounts of feature (hereinafter, "feature amounts") from the content block acquired by the content acquisition unit 21. The feature amounts extracted by the feature amount extraction unit 22 are temporarily stored into the feature amount storage unit 23.

The scene extraction unit 24 segments the content block acquired by the content acquisition unit 21 into a plurality of scenes or extracts scenes from the content block. For example, the scene extraction unit 24 may segment the content block into scenes using a scheme for detecting a scene change or may extract scenes that meet a predetermined condition from the content block. In this instance, a case where scenes meeting a predetermined condition are extracted will now be described as an example. Whether a target scene included in the content block matches a predetermined scene is determined on the basis of the feature amounts extracted by the feature amount extraction unit 22.

For example, the scene extraction unit 24 is configured to store or acquire a first feature amount that a first scene has. The scene extraction unit 24 determines whether a feature amount that agrees with the first feature amount is stored in the feature amount storage unit 23, thereby determining whether a scene included in the content block matches the first scene.

In this embodiment, it is assumed that the scene extraction unit 24 stores a predetermined scene and a feature amount of the scene such that the scene is associated with the feature amount. In this embodiment, only when a feature amount stored in the feature amount storage unit 23 agrees with a feature amount stored in the scene extraction unit 24, a scene corresponding to the feature amount is extracted. The term "agreement" between feature amounts may include not only an exact agreement but also a similarity between them. When the degree of agreement between feature amounts is, for example, 90% or higher, the similarity between them may be determined as the agreement between them.

Accordingly, a feature amount extracted from the content block by the feature amount extraction unit 22 and a feature amount stored in the scene extraction unit 24 are comparative amounts.

When the scene extraction unit 24 extracts a scene, the scene is stored into the scene storage unit 25. Alternatively, when the scene extraction unit 24 extracts a scene, the user may edit the start point and the end point of the scene and the resultant scene may be stored into the scene storage unit 25. Alternatively, the user may extract a scene. The scene extracted by the user may be stored into the scene storage unit 25 together with another scene extracted by the scene extraction unit 24.

Data stored in the scene storage unit 25 includes information whereby a portion determined as a predetermined scene can be specified in the content block acquired by the content acquisition unit 21 or video data corresponding to the determined portion.

As will be described below, in the present embodiment, it is assumed that data (hereinafter, referred to as "content data" or "content data block") related to the content block acquired by the content acquisition unit 21 is stored in the scene storage unit 25 so that the content block is presented as a result of retrieval to the user and the presented content block can be played. In other words, a content data block and information (hereinafter, referred to as "scene information" or "scene information block"), based on the content data block, for specifying a predetermined scene included in the content block are stored such that the content data block is associated with the scene information block.

Figure 2:
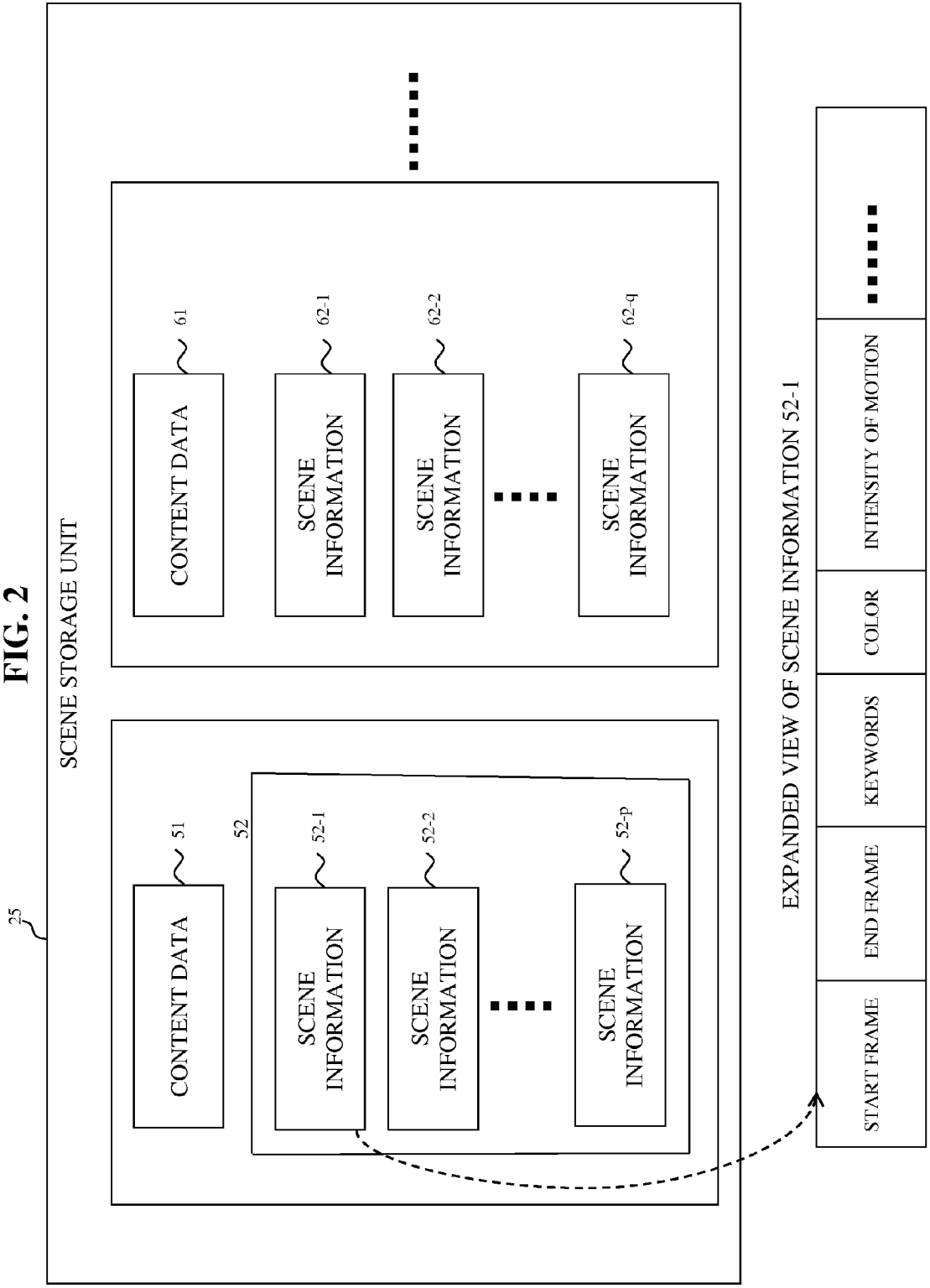
FIG. 2 is a diagram explaining data stored in a scene storage unit.

Data stored in the scene storage unit 25 will now be described with reference to FIG. 2. The scene storage unit 25 stores content data 51 and scene information blocks 52-1 to 52-*p* serving as information blocks concerning scenes in the content data 51 such that the content data 51 is associated with the scene information blocks 52-1 to 52-*p*. The scene storage unit 25 further stores content data 61 and scene information blocks 62-1 to 62-*q* serving as information blocks concerning scenes in the content data 61 such that the content data 61 is associated with the scene information blocks 62-1 to 62-*q*.

As described above, the scene storage unit 25 stores the content data blocks and the scene information blocks associated with the respective content data blocks. In the following description, when it is unnecessary to distinguish the content data 51 from the content data 61, the content data 51 will be described as a representative example. Similarly, the scene information blocks 52 will be described as representative examples. When it is unnecessary to distinguish each of the scene information blocks 52-1 to 52-*p* from the other scene information blocks, those information blocks will be described as scene information 52.

Information included in the scene information 52 is generated upon scene extraction by the scene extraction unit 24. Information included in the scene information 52 may be provided from the user. The scene information 52 may be generated on the basis of information provided from the user as appropriate.

The content data 51 may be data corresponding to the content block or information for specifying the content block. For example, when a content block is acquired via the Internet, information such as an address may be used. The scene information 52 indicates which portion included in the content block based on the content data 51 is extracted as a predetermined scene. For example, the scene information 52 includes frame information for specifying a start frame and an end frame of an extracted scene and information indicating what type of scene.

Information indicating what type of scene is referred to upon scene retrieval by the scene retrieval unit 27. The information processing apparatus 11 shown in FIG. 1 will be described again. The scene retrieval unit 27 determines, on the basis of information stored in the scene storage unit 25 using a method specified by the retrieval method specification unit 26, whether a specified scene is stored.

The retrieval method specification unit 26 receives information used for retrieving a scene desired by the user. For example, the retrieval method specification unit 26 includes an operation unit (not shown), such as a keyboard, which the user operates to input information. Alternatively, the retrieval method specification unit 26 includes an interface (not shown) that is connected to, for example, a network to receive an instruction from the user via the network.

Information input by the user includes an image or video sequence included in a desired scene or a keyword for specifying the desired scene. Such information may include a feature of the desired scene, for example, a high intensity of motion of the scene or a color included in the scene.

For example, when the retrieval method specification unit 26 receives a predetermined image, the scene retrieval unit 27 determines, with reference to the scene information 52, whether a scene including an image that matches the predetermined image or a scene including an image similar to the predetermined image is stored in the scene storage unit 25. Accordingly, the scene information 52 includes information, such as a feature amount of an image included in a scene, whereby a determination can be made as to whether the image matches (or is similar to) the predetermined image.

For example, when the retrieval method specification unit 26 receives a predetermined keyword, the scene retrieval unit 27 determines, with reference to the scene information 52, whether a scene including a keyword that matches the predetermined keyword or a scene including a synonym is stored in the scene storage unit 25. Accordingly, the scene information 52 includes information whereby a determination can be made as to whether a keyword included in a scene matches (or is similar to) the predetermined keyword.

In this case, the term "keyword" included in a scene means a keyword used to annotate the scene, a closed caption on the scene, or a subtitle on the scene. The scene information 52 includes text information obtained by text recognition.

The scene information 52 further includes information regarding a color or an intensity of motion of a subject included in the scene as appropriate.

In other words, the scene information 52 stored in the scene storage unit 25 includes information that is input as an instruction from the user to the retrieval method specification unit 26 and can be retrieved by the scene retrieval unit 27. The information includes information given by a person and information given by scene analysis.

The scene retrieval unit 27 retrieves a scene on the basis of an instruction from the user as described above and supplies a result of retrieval to the retrieval result compilation unit 28. The retrieval result compilation unit 28 performs a process of presenting the content block including the retrieved scenes as a retrieval result to the user. When only the scene retrieved by the scene retrieval unit 27 is presented to the user, the user can acquire a desired scene but a video segment obtained as the retrieved scene may have no meaning. In other words, it is not necessarily that the meaningful result of retrieval is presented to the user.

Therefore, a content block including a retrieved scene is presented to the user. Since the content including the retrieved scene is presented to the user, scenes before and after the retrieved scene are also provided to the user. The user can confirm scenes before and after the desired scene. In other words, the most meaningful result can be presented as a retrieval result to the user.

The result obtained by the retrieval result compilation unit 28 is supplied to the retrieval result display control unit 29. The retrieval result display control unit 29 controls the display apparatus 12 to present the retrieval result (information) supplied from the retrieval result compilation unit 28 to the user.

When the user specifies a content block which the user desires to play from a retrieval result displayed on the display apparatus 12, the playback instruction unit 31 supplies an instruction to play the specified content block to the playback display control unit 30. The playback display control unit 30 specifies the content block which the user specifies on the basis of information supplied from the retrieval result display control unit 29, reads data regarding the specified content block from the scene storage unit 25, and controls the display apparatus 12 on the basis of the read data to display the content block specified by the user.

Figure 3:
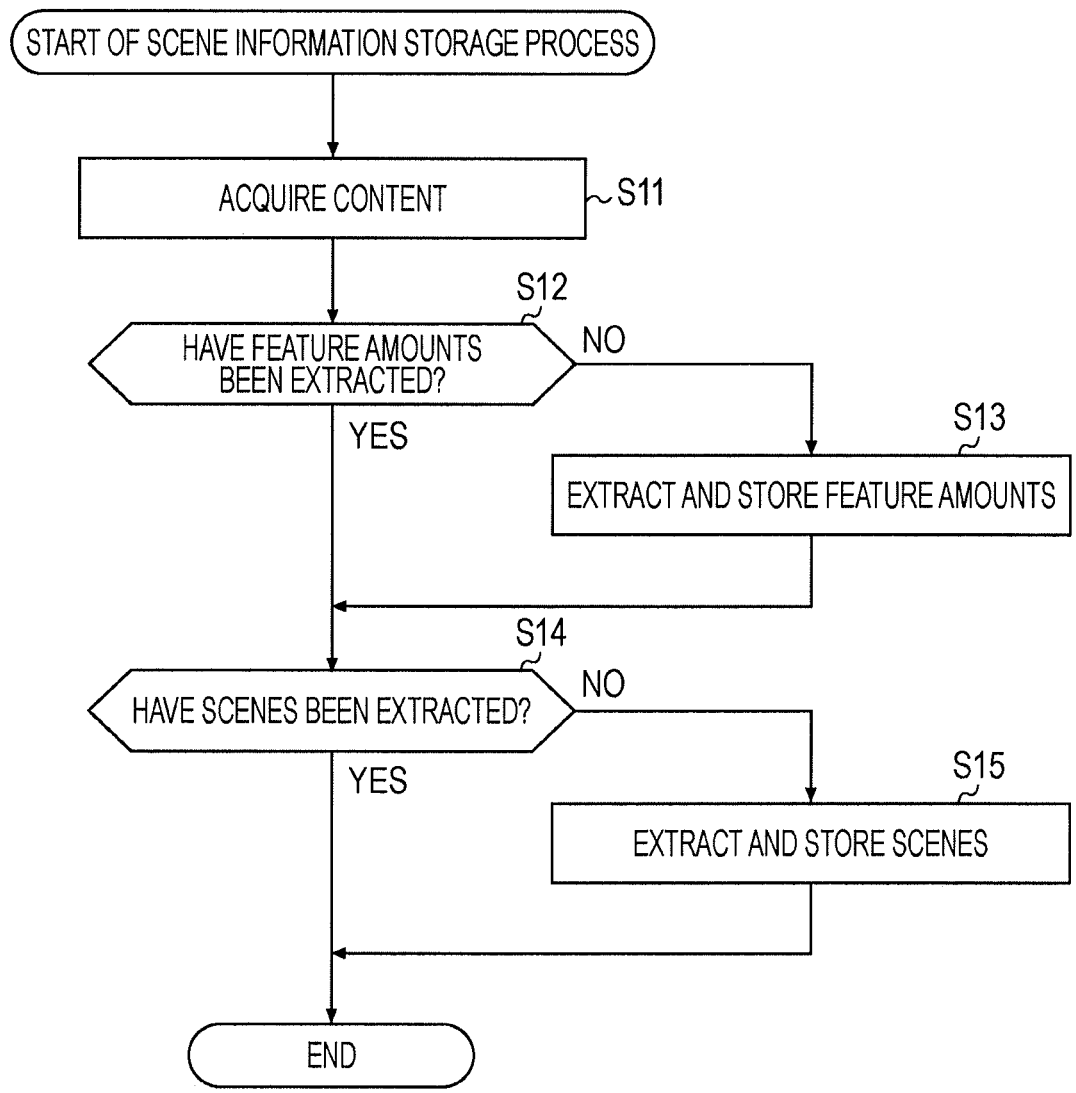
FIG. 3 is a flowchart explaining a process for storage of scene information.

An operation of the information processing apparatus 11 having the above-described structure will now be described with reference to flowcharts shown in FIGS. 3 and 4.

First, a process for storage of scene information 52 into the scene storage unit 25 will be described with reference to the flowchart shown in FIG. 3. In step S11, the content acquisition unit 21 acquires content data 51. The content data 51 is, for example, content data held in a local environment, such as a user's personal computer connected to the information processing apparatus 11 or content data acquired via the Internet. The content data acquired via the Internet may be content data shared by a content shared system.

In step S12, a determination is made as to whether feature amounts have been extracted from the acquired content data 51. When it is determined in step S12 that the feature amounts have already been extracted, the process proceeds to step S14. When it is determined that any feature amount is not extracted, the process proceeds to step S13.

In step S13, the feature amount extraction unit 22 extracts feature amounts from the acquired content data 51 and stores the feature amounts into the feature amount storage unit 23. As described above, the extracted feature amounts correspond to information to be used when the scene extraction unit 24 in the next stage extracts a scene.

In step S14, a determination is made as to whether scenes have already been extracted from a content block based on the acquired content data 51. In other words, a determination is made in step S14 as to whether the scene information 52 has already been generated from the acquired content data 51. When it is determined in step S14 that scenes have already been extracted, the process for storage of the scene information 52 is terminated. When it is determined that any scene is not extracted, the process proceeds to step S15.

In step S15, the scene extraction unit 24 extracts a predetermined scene from the content block based on the content data 51 with reference to the feature amounts stored in the feature amount storage unit 23. As described above, the scene extraction unit 24 manages, for example, a feature amount associated with the predetermined scene and compares the managed feature amount with the feature amounts stored in the feature amount storage unit 23 to extract the predetermined scene.

Alternatively, the user may extract a scene. As described above, the scene extraction unit 24 extracts a scene which is previously set as a target to be retrieved. The user may extract a scene in accordance with the user's preference.

When the scene extraction unit 24 extracts a scene, the scene extraction unit 24 generates scene information 52, associates the generated scene information 52 with the content data 51, and stores the content data 51 and the scene information 52 into the scene storage unit 25. The execution of the above-described process allows for construction of a database in which the content data 51 is associated with the scene information 52 as shown in FIG. 2.

Scene extraction subsequent to the construction of the database will now be described with reference to the flowchart of FIG. 4.

In step S31, an instruction given by the user is supplied to the retrieval method specification unit 26. As described above, when the user wants to retrieve a desired scene, the user inputs an image or a video sequence, a keyword, or a feature as information regarding the scene that the user wants to retrieve. The input information is acquired in step S31.

In step S32, the scene retrieval unit 27 retrieves a scene that meets the user instruction acquired by the retrieval method specification unit 26. Specifically, the scene retrieval unit 27 analyzes the user instruction acquired by the retrieval method specification unit 26 and determines whether scene information 52 corresponding or similar to the result of analysis is stored in the scene extraction unit 24. When determining that the scene information 52 is stored in the scene extraction unit 24, the scene retrieval unit 27 executes scene retrieval. All or part of the scene information 52 stored in the scene storage unit 25 is subjected to this retrieval. When the number of scene information blocks 52 is large, it takes long time to retrieve. Accordingly, scene information blocks 52 classified according to a predetermined scheme may be targeted for retrieval.

A predetermined threshold may be set in the scene retrieval unit 27. When the degree at which a predetermined scene meets the instruction from the user is the set threshold or higher, the scene retrieval unit 27 may extract the scene as a scene that meets the user instruction.

In step S33, the retrieval result compilation unit 28 compiles scenes retrieved by the scene retrieval unit 27. The compilation of scenes is performed in order to present a content block including the retrieved scenes as a result of retrieval to the user. When a plurality of scenes are retrieved from different content blocks, the content blocks are presented to the user. In the case where a plurality of content blocks are presented, it is necessary to determine the order in which the content blocks are presented to the user. A manner of determining the order will now be described with reference to FIG. 5.

Figure 5:
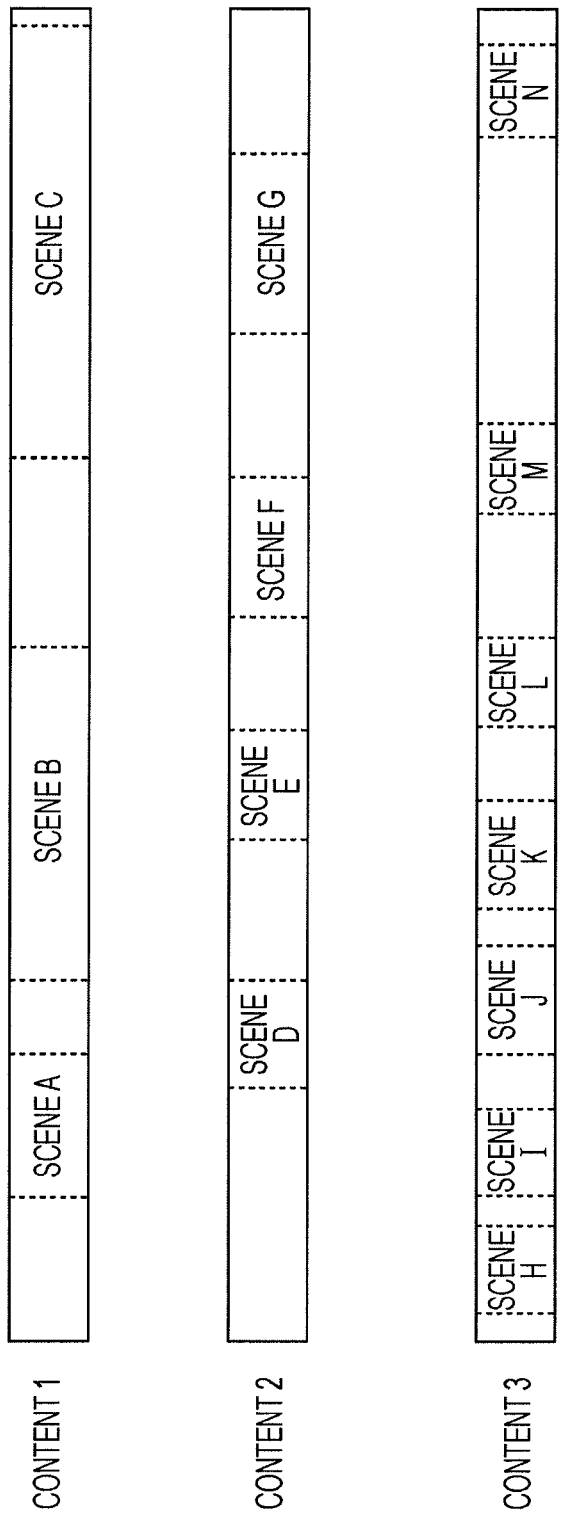
FIG. 5 is a diagram explaining how to determine the order in which scenes obtained as a result of retrieval are presented.

FIG. 5 is a diagram illustrating the number of scenes in each content block and the length of each scene. Referring to FIG. 5, content 1 includes scenes A, B, and C. Content 2 includes scenes D, E, F, and G. Content 3 includes scenes H, I, J, K, L, M, and N. The scenes A to N are extracted as a result of retrieval by the scene retrieval unit 27.

In FIG. 5, the lateral direction indicates time. For convenience of explanation, the content blocks 1 to 3 have the same length in FIG. 5. In addition, the lateral length of each scene in FIG. 5 denotes the duration of the scene.

For example, when the scene A is supplied as a result of retrieval, the retrieval result compilation unit 28 sets the content 1 including the scene A as a candidate for the retrieval result. The retrieval result compilation unit 28 sets a content block including a supplied scene as a candidate for a retrieval result as described above. Similarly, when the scene D is supplied as a retrieval result, the retrieval result compilation unit 28 sets the content 2 including the scene D as a candidate for the retrieval result.

For example, when the scenes A and D are supplied as a result of retrieval, the retrieval result compilation unit 28 sets the content 1 including the scene A and the content 2 including the scene D as candidates for the retrieval result. When a plurality of content blocks are set as candidates for a retrieval result, it is necessary to assign priorities to the content blocks. The retrieval result compilation unit 28 determines the order in which the content blocks are presented to the user according to a predetermined rule.

According to a first rule, the order is determined on the basis of the number of included scenes. Referring to FIG. 5, the content 1 includes three scenes, the content 2 includes four scenes, and the content 3 includes seven scenes. When the order is determined according to the first rule, priorities are assigned to the content 3, the content 2, and the content 1 in that order. Accordingly, the content 3, the content 2, and the content 1 are presented to the user in that order.

According to a second rule, the order is determined in the order from the longest scene in the content blocks. Referring to FIG. 5, the scene C included in the content 1 is the longest. Accordingly, the highest priority is assigned to the content 1. The second longest scene is the scene B. Since the scene B is included in the content 1 and the highest priority has already been assigned to the content 1, the scene B is excluded. In this manner, the order is determined so that the same content block is redundantly presented to the user. When the order is determined according to the second rule, priorities are assigned to the content 1, the content 2, and the content 3 in that order. Accordingly, the content 1, the content 2, and the content 3 are presented to the user in that order.

According to a third rule, the order is determined in the order from the longest sum of the durations of included scenes. Referring to FIG. 5, when the sum of the durations of the respective scenes in each content block is calculated, the content 1, the content 3, and the content 2 are arranged in the order from the longest sum of the durations of scenes. Accordingly, priorities are assigned to the content 1, the content 3, and the content 2 in that order. The content blocks are presented to the user in that order.

According to a fourth rule, the proportion of the sum of the durations of included scenes in each content block is calculated and the order is determined in the order from the highest proportion. In FIG. 5, it is assumed that the content blocks 1 to 3 have the same length. Actually, in many cases, the content blocks have different lengths. Accordingly, the order in which the content blocks are presented may be determined in the order from the longest sum of the durations of included scenes, i.e., according to the third rule. Alternatively, the proportion of the sum of the durations of included scenes in each content block may be calculated and the order may be determined in the order from the highest proportion. In the case where priorities are assigned according to the fourth rule, if the content blocks 1 to 3 have the same length, priorities are assigned to the content 1, the content 3, and the content 2 in that order. The content blocks are presented to the user in that order.

According to a fifth rule, the order is determined on the basis of a value, such as the degree at which a scene meets a user instruction, obtained upon retrieving a scene by the scene retrieval unit 27. For example, the sum of the degrees of respective scenes in each content block may be obtained and priorities may be assigned to the content blocks in the order from the highest sum. Alternatively, priorities may be assigned to the content blocks such that the highest priority is assigned to the content block including a scene having the highest degree.

The first to fifth rules have been described as examples. Another rule may be provided. In addition, when the retrieval result compilation unit 28 assigns priorities to the content blocks, the priorities may be assigned to the content blocks according to any one of the first to fifth rules or using the combination of some of the rules.

The flowchart of FIG. 4 will be described again. When the retrieved scenes are compiled as a result of retrieval in step S33, the retrieval result display control unit 29 controls the display apparatus 12 on the basis of information regarding the retrieval result from supplied from the retrieval result compilation unit 28 to present the retrieval result to the user.

With the execution of the above-described processing, the content blocks including the scenes desired by the user are presented in the form of the most meaningful unity to the user. With this presentation, although the content blocks are retrieved in units of scenes, the retrieval result can be presented to the user without making the user aware of the retrieval in units of scenes.

The retrieval in units of scenes can provide higher accuracy than retrieval in units of content blocks. The high accuracy retrieval service can be provided to the user without making the user aware of the retrieval in units of scenes.

The user can refer to the retrieval result displayed on the display apparatus 12 and play a desired content block. In this case, a determination is made in step S35 as to whether a playback instruction is given. When the playback instruction is given, the playback instruction unit 31 receives the instruction from the user. Accordingly, a determination is made as to whether such an instruction is input, so that processing in step S35 can be performed.

Figure 4:
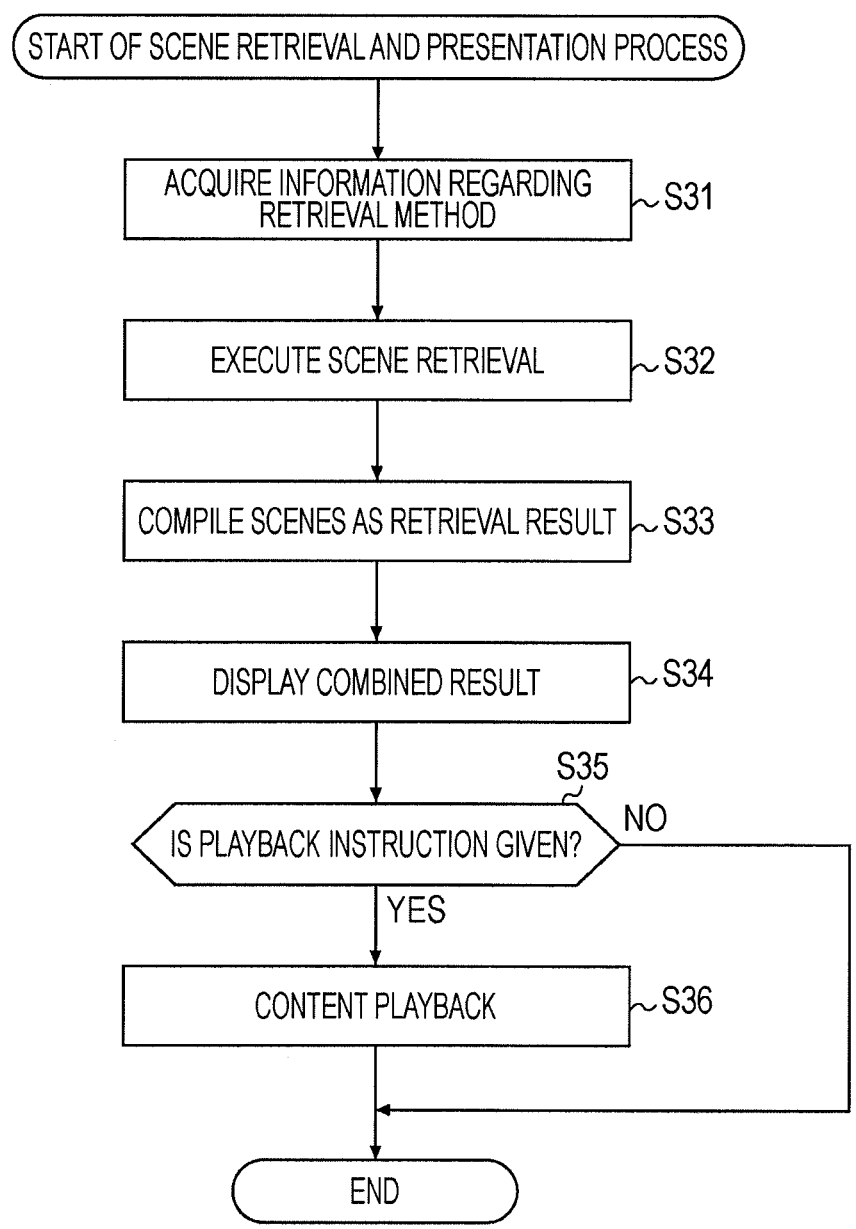
FIG. 4 is a flowchart explaining a process for scene retrieval.

When it is determined in step S35 that any playback instruction is not given, for example, when a new retrieval instruction or a termination instruction is given from the user, the process in the flowchart of FIG. 4 is terminated.

When it is determined in step S35 that the playback instruction is given, the process proceeds to step S36 and content playback is performed. Specifically, a content block that is selected by the user and is related to the playback instruction is specified. When receiving the playback instruction from the user, the playback instruction unit 31 transmits information regarding the reception of the playback instruction to the playback display control unit 30 and also supplies information for specifying the content block related to the playback instruction, e.g., coordinates on the display apparatus 12 where the content name (information) the user selects is displayed, to the playback display control unit 30.

When receiving the information regarding the reception of the playback instruction, the playback display control unit 30 specifies the content block related to the playback instruction on the basis of the supplied information. For example, the playback display control unit 30 checks the supplied information regarding the coordinates against information supplied from the retrieval result display control unit 29 to specify the content block related to the playback instruction.

When the content block is specified, the playback display control unit 30 reads the content data 51 of the specified content block from the scene storage unit 25. When the content data 51 is stored in the scene storage unit 25, the content data 51 is read. If the content data 51 indicates, for example, an address, content data is obtained via the Internet on the basis of the address.

The playback display control unit 30 controls the display apparatus 12 on the basis of the acquired content data 51 to provide the content block that the user desires to play. Consequently, the content block desired by the user is provided to the user.

As for playback of the content block, the content block may be played from the beginning thereof. Alternatively, the content block may be played from, for example, a portion designated by the user. In addition, a mechanism for playing a digest of retrieved scenes may be provided.

According to the embodiment of the present invention, as described above, scenes can be retrieved from a content block with high accuracy using a feature amount or annotation data assigned to each scene and a result of retrieval can be presented as a video content block in the form of the most meaningful unity to the user. Consequently, high accuracy video content retrieval service can be provided to the user without making the user aware of the retrieval in units of scenes.

In the above-described embodiment, the scene information 52 is stored into the scene storage unit 25 and, after that, retrieval is performed. When a retrieval instruction is given, a series of processing steps of extracting feature amounts from a content block, extracting scenes, and retrieving target scenes may be performed.

The above-described series of processing steps can be executed by hardware or software. When the above-described series of processing steps is executed by software, a program constituting the software is installed from a program recording medium into a computer incorporated in dedicated hardware or into a multi-purpose personal computer which is capable of executing various functions by installing various programs.

Figure 6:
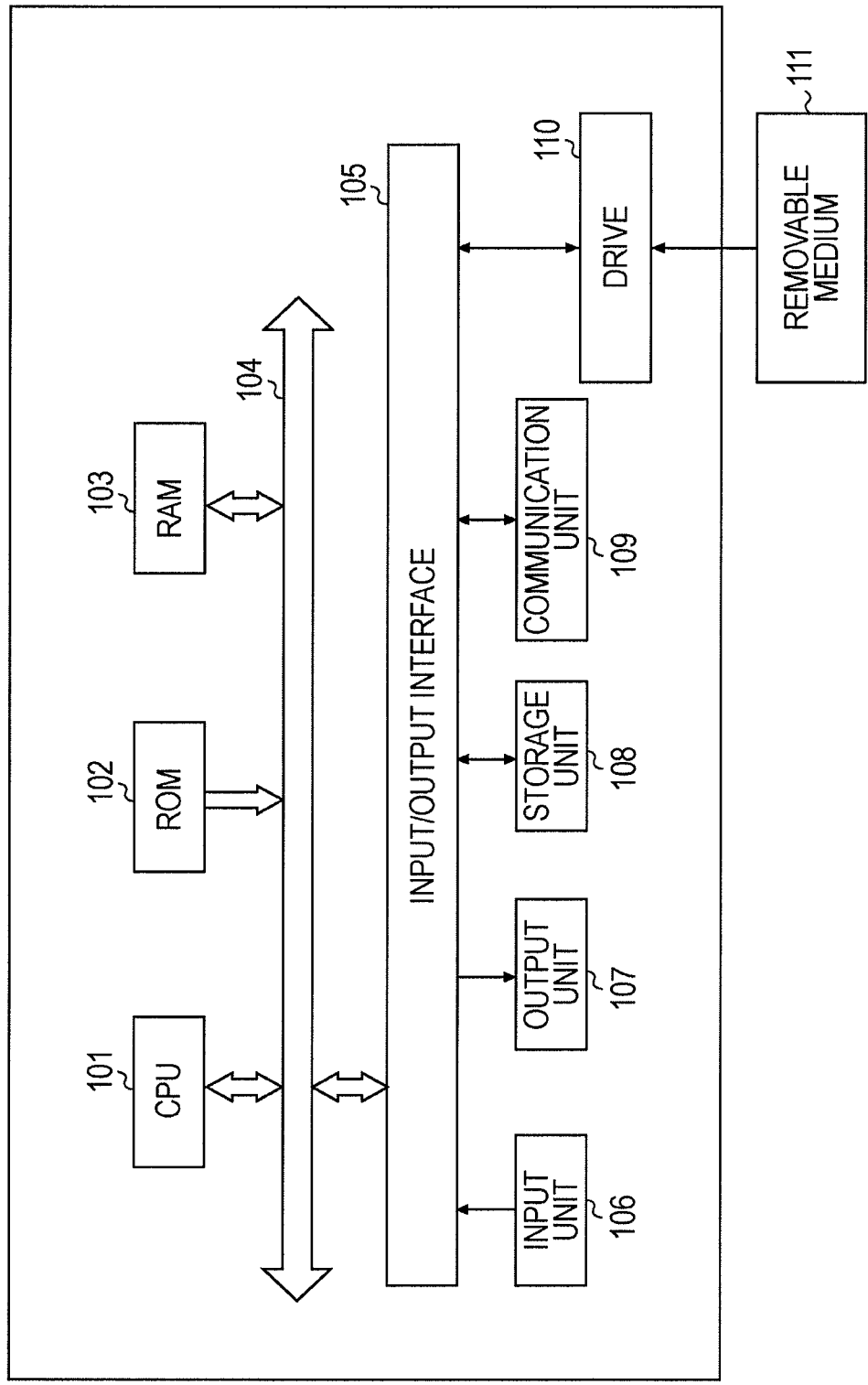
FIG. 6 is a diagram explaining a recording medium.

FIG. 6 is a block diagram illustrating the structure of hardware of a personal computer that executes the above-described series of processing steps in accordance with a program.

In the computer, a central processing unit (CPU) 101, a read only memory (ROM) 102, a random access memory (RAM) 103 are connected to each other via a bus 104.

The bus 104 is connected to an input/output interface 105. An input unit 106 including a keyboard, a mouse, and a microphone, an output unit 107 including a display and a speaker, a storage unit 108 including a hard disk and a non-volatile memory, a communication unit 109 including a network interface, and a drive 110 that drives a removable medium 111, such as a magnetic disk, an optical disk, a magneto-optical disk, or a semiconductor memory, are connected to the input/output interface 105.

In the computer with the above-described structure, the CPU 101 loads, for example, a program stored in the storage unit 108 into the RAM 103 through the input/output interface 105 and the bus 104 and executes the program, thus performing the above-described series of processing steps.

As for the program executed by the computer (CPU 101), the program recorded on the removable medium 111 serving as a package medium, such as a magnetic disk (including a flexible disk), an optical disk (e.g., a compact disk-read only memory (CD-ROM) or a digital versatile disk (DVD)), a magneto-optical disk, or a semiconductor memory may be provided. Alternatively, the program may be transferred through a wired or wireless transmission medium, such as a local area network, the Internet, or digital satellite broadcasting.

After the removable medium 111 is loaded into the drive 110, the program may be installed to the storage unit 108 through the input/output interface 105. Alternatively, the program may be received by the communication unit 109 through the wired or wireless transmission medium and be then installed to the storage unit 108. Alternatively, the program may be previously installed in the ROM 102 or the storage unit 108.

The program executed by the computer may be a program including processing steps which are carried out in time series in the described order in this specification or a program including processing steps which are carried out in parallel or individually at necessary timing, for example, in response to a call request.

The term "system" in this specification is the entire apparatus including a plurality of devices.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for retrieving and presenting to a user image content blocks desired by the user, comprising:

a content acquisition section that acquires image content blocks via the Internet;

a feature amount extraction section that extracts amounts of content features of images from an image content block acquired via the Internet, wherein the amounts of content features include an intensity of motion of a subject in the images included in the image content block;

an extraction section that extracts predetermined scenes from the image content block using the amounts of content features extracted by the feature amount extraction section;

a storage section that stores the image content block, the extracted scenes, and scene information associated with the image content block, wherein the scene information includes an Internet address that is used to acquire the image content block via the Internet;

an acquisition section that acquires information including a video sequence that includes a subject and information regarding predetermined content features of the subject included in the video sequence as a search reference for retrieving the image content block;

a retrieval section that retrieves from the extracted scenes a scene whose degree of agreement with the video sequence included in the search reference is higher than a threshold set by a user from among the scenes extracted by the extraction section; and a presentation section that presents the image content block including the scene retrieved by the retrieval section as a result of retrieval, a first scene that is in the same image content block and before the scene, and a second scene that is in the same image content block and after the scene, wherein the presentation section obtains the degree of agreement of each scene of the image content block and sums the degree of agreement of each scene as priority information of the image content block to present image content blocks desired by the user in an order determined by the priority information.

2. The apparatus according to claim 1, wherein when presenting a plurality of image content blocks, the presentation section assigns priorities to the image content blocks in the order from the largest number of scenes retrieved by the retrieval section and presents the image content blocks in accordance with the priorities.

3. The apparatus according to claim 1, wherein when presenting a plurality of image content blocks, the presentation section obtains the sum of the durations of scenes retrieved from each image content block by the retrieval section assigns priorities to the image content blocks in the order from the highest sum, and presents the image content blocks in accordance with the priorities.

4. The apparatus according to claim 1, wherein when presenting a plurality of image content blocks, the presentation section obtains the proportion of the sum of the durations of scenes retrieved by the retrieval section in each image content block, assigns priorities to the image content blocks in the order from the highest proportion, and presents the image content blocks in accordance with the priorities.

5. The apparatus according to claim 1, wherein when presenting a plurality of image content blocks, the presentation section obtains the degree at which each scene retrieved by the retrieval section meets the information, assigns priorities to the image content blocks in the order from the highest degree, and presents the image content blocks in accordance with the priorities.

6. A method for information processing for retrieving and presenting to a user image content blocks desired by the user, the method comprising the steps of:

acquiring image content blocks via the Internet;

extracting amounts of content features of images from the image content block acquired via the Internet, wherein the amounts of content features include an intensity of motion of a subject of the images included in the image content block;

extracting predetermined scenes from the image content block using the extracted amounts of content features;

storing the image content block, the extracted scenes, and scene information associated with the image content block, wherein the scene information includes an Internet address that is used to acquire the image content block via the Internet;

acquiring information including a video sequence that includes a subject and information regarding predetermined content features of the subject of the images included in the video sequence as a search reference for retrieving the image content block;

retrieving from the extracted scenes a scene whose degree of agreement with the video sequence included in the search reference is higher than a threshold set by a user from among the extracted scenes; and presenting the image content block including the retrieved scene as a result of retrieval, a first scene that is in the same image content block and before the scene, and a second scene that is in the same image content block and after the scene, wherein the presenting step obtains the degree of agreement of each scene of the image content block and sums the degree of agreement of each scene as priority information of the image content block to present image content blocks desired by the user in an order determined by the priority info information.

7. A recording medium in which a computer-readable program is recorded, the program for retrieving and presenting to a user image content blocks desired by the user, the program comprising the steps of:

acquiring image content blocks via the Internet;

extracting amounts of content features of images from an image content block acquired via the Internet, wherein the amounts of content features include an intensity of motion of a subject included in the image content block;

extracting predetermined scenes from the image content block using the extracted amounts of content features;

storing the image content block, the extracted scenes, and scene information associated with the image content block, wherein the scene information includes an Internet address that is used to acquire the image content block via the Internet;

acquiring information including a video sequence that includes a subject and information regarding predetermined content features of the subject of the images included in the video sequence as a search reference for retrieving the image content block;

retrieving from the extracted scenes a scene whose degree of agreement with the video sequence included in the search reference is higher than a threshold set by a user from among the extracted scenes; and presenting the image content block including the retrieved scene as a result of retrieval, a first scene that is in the same image content block and before the scene, and a second scene that is in the same image content block and after the scene, wherein the presenting step obtains the degree of agreement of each scene of the image content block and sums the degree of agreement of each scene as priority information of the image content block to present image content blocks desired by the user in an order determined by the priority information.

8. An information processing apparatus for retrieving and presenting to a user image content blocks desired by the user, comprising:

a content acquisition unit that acquires image content blocks via the Internet;

a feature amount extraction unit that extracts amounts of content features of images from an image content block acquired via the Internet, wherein the amounts of content features include an intensity of motion of a subject of images included in the image content block;

an extraction unit that extracts predetermined scenes from the image content block using the amounts of content features extracted by the feature amount extraction unit;

a storage unit that stores the image content block, the extracted scenes, and scene information associated with the image content block, wherein the scene information includes an Internet address that is used to acquire the image content block via the Internet;

an acquisition unit that acquires information including a video sequence that includes a subject and information regarding predetermined content features of the subject of the images included in the video sequence as a search reference for retrieving the image content block;

a retrieval unit that retrieves from the extracted scenes a scene whose degree of agreement with the video sequence included in the search reference is higher than a threshold set by a user from among the scenes extracted by the extraction unit; and a presentation unit that presents the image content block including the scene retrieved by the retrieval unit as a result of retrieval, a first scene that is in the same image content block and before the scene, and a second scene that is in the same image content block and after the scene, wherein the presentation unit obtains the degree of agreement of each scene of the image content block and sums the degree of agreement of each scene as priority information of the image content block to present image content blocks desired by the user in an order determined by the priority information.

* * * * *